United States Patent [19]
Huber et al.

[11] Patent Number: 5,629,994
[45] Date of Patent: May 13, 1997

[54] OPTICAL WDM COUPLING SYSTEMS

[75] Inventors: Manfred Huber, Graefelfing; Volker Tegtmeyer, Munich; Hartmut Wolf, Peissenberg, all of Germany

[73] Assignee: Siemens Aktiengesellschaft, Munich, Germany

[21] Appl. No.: 499,455

[22] Filed: Jul. 7, 1995

[30] Foreign Application Priority Data

Jul. 8, 1994 [DE] Germany .................... 44 24 139.9

[51] Int. Cl.$^6$ ................................. G02B 6/28
[52] U.S. Cl. .................. 385/24; 385/20; 385/16; 359/123
[58] Field of Search ................... 385/24, 16, 17, 385/20, 21, 31; 359/117, 123, 124

[56] References Cited

U.S. PATENT DOCUMENTS

| | | | |
|---|---|---|---|
| 5,170,274 | 12/1992 | Nishio | 359/128 |
| 5,194,977 | 3/1993 | Nishio | 359/128 |
| 5,208,691 | 5/1993 | Nishio | 385/16 X |
| 5,361,254 | 11/1994 | Storck et al. | 370/57 |

FOREIGN PATENT DOCUMENTS 0494831  7/1992  European Pat. Off. .

OTHER PUBLICATIONS

Sato et al., "Optical Path Layer Technologies to Enhance B-ISDN Performance", Conference Record, vol. 3/3, Communications – Technology that Unites Nations, ICC '93, pp. 1300–1307. Feb. 1993.

H. Rokugawa et al., "Wavelength Conversion Laser Diodes Application to Wavelength-Division Photonic Cross-Connect Node with Multistage Configuration", IEICE Transactions on Communications, vol. E75-B, No. 4, Apr. 1992, Tokyo, JP, pp. 267–274.

*Primary Examiner*—Phan T. H. Palmer
*Attorney, Agent, or Firm*—Hill, Steadman & Simpson

[57] ABSTRACT

An optical coupling system for wavelength-individual through-connection between wavelength-division multiplex (WDM) a plurality of input and output fibers with simultaneous possibility of wavelength conversion is provided. A respective optical splitter individually associated to an input fiber multiplies the WDM signal incoming on the appertaining input fiber into a·m WDM signals that are supplied to a·m tunable optical filters, wherein a is the plurality of output fibers and m is the plurality of wavelengths combined in a respective wavelength-division multiplex on an output fiber. Respectively, a plurality e of tunable filters connected to the plurality e of input fibers, combined at the output side via an optical combiner, lead to a wavelength converter that is connected to an input of a wavelength-division multiplexer preceding an output fiber.

2 Claims, 1 Drawing Sheet

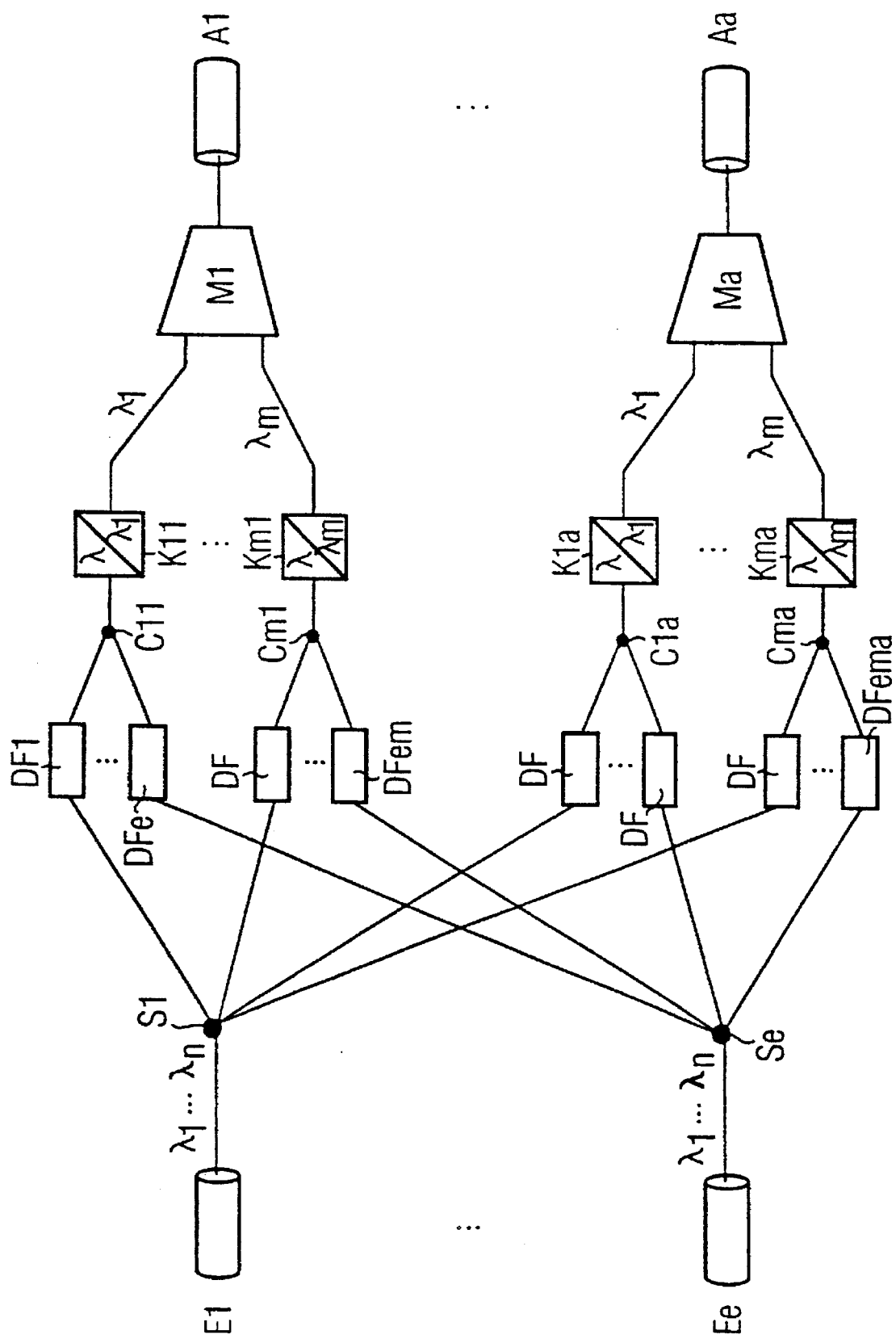

OPTICAL WDM COUPLING SYSTEMS

BACKGROUND OF THE INVENTION

1. Field of the Invention

The present invention is directed generally to fiber optic communication systems and more specifically to optical coupling systems for wavelength-individual through-connection between wavelength-division multiplex (WDM) input and output fibers given simultaneously possible wavelength conversion.

2. Description of the Related Art

WDM coupling system having wavelength demultiplexers on the input side, wavelength multiplexers on the output side, and wavelength converters for wavelength conversion onto the respectively outgoing wavelength, as well as a space coupling arrangement lying therebetween, are known, for example, from ntz 46 (1993)1, pages 16–21 (see FIG. 13 and FIG. 14 therein). A WDM coupling system having the same structure is also known from Conf. Proc. ICC '93, pages 1300–1307. Such a WDM coupling system includes: wavelength demultiplexers at the input side that respectively divide the incoming optical signal on the associated input fiber according to wavelengths; a subsequent space coupling arrangement; subsequent variable wavelength converters that convert the respectively incoming wavelength onto the respectively outgoing wavelength; and wavelength multiplexers at the output side that combine the wavelengths supplied to them.

SUMMARY OF THE INVENTION

In contrast to the above-identified known WDM coupling systems having a space coupling system, the present invention provides a different coupling system structure that can eliminate such a space coupling system.

An embodiment of the present invention advantageously provides an optical coupling system for wavelength-individual through-connection between wavelength-division multiplex (WDM) input fibers and output fibers with the simultaneous possibility of wavelength conversion. This coupling system inventively provides a respective optical splitter individually associated with an input fiber. The optical splitter multiplies the WDM signal incoming on the appertaining input fiber into a·m WDM signals that are supplied to a·m tunable optical filters, wherein a is the plurality of output fibers and m is the plurality of wavelengths respectively combined in a wavelength-division multiplex on an output fiber. Respectively, a plurality of e tunable filters are connected to the plurality of e input fibers. The tunable filters are combined at the output side via an optical combiner. After the optical combiner, a wavelength converter is connected to an input of a wavelength multiplexer preceding an output fiber.

The invention advantageously enables a call through-connect between arbitrary input fibers and output fibers without requiring a separate space coupling system. In addition to point-to-point connections, point-to-multipoint connections can thereby also be realized.

Further characteristics of the invention are discussed in the following detailed description with reference to the drawing.

BRIEF DESCRIPTION OF THE DRAWINGS

The figure is a schematic diagram of an embodiment of the present invention.

DETAILED DESCRIPTION OF THE PREFERRED EMBODIMENTS

In a scope required for an understanding of the invention, the drawing schematically shows an exemplary embodiment of an optical coupling system of the present invention that lies between a plurality e of input fibers (E1, . . . ,Ee) and a plurality a of output fibers (A1, . . . ,Aa). A maximum plurality n of wavelengths ($\lambda_n, \ldots, \lambda_n$) can be combined in wavelength-division multiplex on one input fiber, and a maximum of m wavelengths ($\lambda_1, \ldots, \lambda_m$) can be combined in WDM on one output fiber. The input fibers (E1, . . . ,Ee) respectively connect to a plurality e of optical splitters (S1, . . . ,Se) individually associated with an input fiber. The WDM signal incoming on the appertaining input fiber is multiplied into a·m WDM signals by the optical splitter. The a·m WDM signals are supplied to a·m tunable filters. Of the total of e·m·a tunable filters (DF1, . . . , DFe, . . . , DFem, . . . ,DFema), respectively, a plurality e of tunable filters connected to the plurality e of input fibers (E1, . . . , Ee), for example, the filters (DF1, . . . ,DFe), are combined at the output side via an optical combiner (C11, . . . , Cm1, . . . ,C1a, . . . ,Cma; specifically, via the combiner C11 as shown in the example). After the optical combiners, the system provides a plurality of wavelength converters (K11, . . . ,Km1, . . . ,K1a, . . . ,Kma; specifically, the wavelength converter K11 as shown in the example). An output of the wavelength converter is connected to the input of a wavelength-division multiplexer (M1, . . . Ma) that precedes one of the plurality of output fibers (specifically, the output fiber A1 as shown in the example).

The tunable filters (DF1, . . . ,DFe, . . . DFem, . . . ,DFema) are operated so that respectively no more than one tunable filter (DF1, . . . ,DFe) connected to one and the same wavelength converter (for example, K11) allows the signal of a specific selected wavelength (for example, $\lambda_n$) to pass, whereas the other filters connected to the appertaining wavelength converter (K11 in the example) are inhibited. The appertaining signal at the wavelength of which the appertaining filter (for example, DFe) is tuned at that moment, proceeds to the subsequent wavelength converter (K11). The wavelength converter converts the appertaining signal onto a permanently defined (output) wavelength ($\lambda_1$ in the example) independently of the previous (input) wavelength ($\lambda_n$).

The above explanation is based on the example of a point-to-point connection in which a signal incoming on the input fiber Ee with the wavelength $\lambda_n$ is converted in a signal forwarded on the output fiber A1 with the wavelength $\lambda_1$.

When the signal incoming on the input fiber Ee having wavelength $\lambda_n$ is supplied not only to one, but to a plurality of wavelength converters, which can thereby lead to one and the same or to a plurality of wavelength-division multiplexers, a corresponding point-to-multipoint connection is obtained, which operates in accordance with the principles of the present invention and, therefore, requires no further explanation.

Apparatus and principles for realizing the individual optical components of the WDM coupling system described above are fundamentally known (for example, from Paul E. Green, Jr., *Fiber Optics Networks*, Prentice Hall, Englewood Cliffs, N.J.). Thus, no further explanations are required with respect to understanding the present invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An optical coupling system for providing wavelength-individual through-connection between a plurality of wavelength-division multiplex (WDM) optical input fibers having a WDM signal thereon and a plurality of optical output fibers given simultaneously possible wavelength conversion, the system comprising:

a plurality of optical splitters individually associated with said plurality of input fibers respectively, said optical splitters constructed and arranged to multiply the WDM signal incoming on the associated optical input fiber to provide an increased plurality of WDM signals;

a plurality of tunable optical filters connected to the optical splitters to receive the increased plurality of WDM signals, said tunable optical filters capable of inhibiting and providing an output signal;

a plurality of optical combiners connected to the plurality of tunable filters to receive said output signal therefrom, said optical combiners providing a further output signal;

a plurality of wavelength converters respectively connected to the optical combiners to receive said further output signal therefrom and to convert said further output signal to a defined wavelength output independently of the input wavelength of said further output signal; and a plurality of wavelength division multiplexers constructed and arranged to receive said defined wavelength output from said plurality of wavelength converters and to provide said defined wavelength output to a respective one of said plurality of output fibers.

2. A method of optically coupling a wavelength-individual through-connection between a plurality of wavelength-division multiplex (WDM) input fibers and a plurality of output fibers given simultaneously possible wavelength conversion, the method comprising the steps of:

providing a WDM input signal on said plurality of input fibers;

multiplying said WDM signal into a plurality of WDM signals;

supplying said plurality of WDM signals to a plurality of tunable optical filters, the optical filters having an output connected to a respective wavelength converter via a respective optical combiner;

operating said tunable optical filters such that no more than one tunable optical filter of said plurality of tunable optical filters connected to said respective wavelength converter allows the signal of a specific, selected wavelength to pass, while the remaining tunable optical filters connected to said respective wavelength converter are inhibited; and converting the specific, selected wavelength signal to a defined output wavelength signal independently of the wavelength of the specific, selected wavelength signal.

* * * * *